(12) United States Patent
Nakanishi et al.

(10) Patent No.: US 8,455,148 B2
(45) Date of Patent: Jun. 4, 2013

(54) FUEL CELL

(75) Inventors: Haruyuki Nakanishi, Susono (JP);
Shigeaki Murata, Numazu (JP);
Masahiro Imanishi, Susono (JP);
Yoshihisa Tamura, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1259 days.

(21) Appl. No.: 11/990,707

(22) PCT Filed: Aug. 31, 2006

(86) PCT No.: PCT/JP2006/317693
§ 371 (c)(1),
(2), (4) Date: Mar. 14, 2008

(87) PCT Pub. No.: WO2007/026952
PCT Pub. Date: Mar. 8, 2007

(65) Prior Publication Data
US 2009/0253009 A1 Oct. 8, 2009

(30) Foreign Application Priority Data
Aug. 31, 2005 (JP) ................................ 2005-252458

(51) Int. Cl.
*H01M 8/04* (2006.01)
*H01M 8/24* (2006.01)
*H01M 2/20* (2006.01)

(52) U.S. Cl.
USPC ........... 429/435; 429/434; 429/466; 429/467; 429/469

(58) Field of Classification Search
USPC .......................... 429/434–435, 466, 467, 469
See application file for complete search history.

(56) References Cited

U.S. PATENT DOCUMENTS

| | | | | |
|---|---|---|---|---|
| 5,103,871 A | * | 4/1992 | Misawa et al. | 138/148 |
| 2005/0026028 A1 | * | 2/2005 | Ouchi et al. | 429/38 |

FOREIGN PATENT DOCUMENTS

| | | |
|---|---|---|
| DE | 40 13 269 A1 | 10/1991 |
| JP | 00-299112 | * 11/1993 |
| JP | 5-299112 A | 11/1993 |
| JP | 09-223507 | 8/1997 |
| JP | 2004-505417 A | 2/2004 |
| JP | 2004-158335 A | 6/2004 |
| JP | 2006-216418 A | 8/2006 |

OTHER PUBLICATIONS

Office Action issued Jul. 20, 2011 in the corresponding German Patent Application and translation thereof.

* cited by examiner

*Primary Examiner* — Eugenia Wang
(74) *Attorney, Agent, or Firm* — Kenyon & Kenyon LLP

(57) ABSTRACT

The present invention provides a fuel cell which is capable to improve heat exchange efficiency with a plurality of tubular cells. The fuel cell of the present invention comprises: a plurality of tubular cells; heat exchangers arranged at the outside of the tubular cells, wherein at least a part of the outer circumferential surface of said tubular cells and the peripheral surface of said heat exchangers have face contact with each other.

22 Claims, 8 Drawing Sheets

21a

21a

20

21b

21b

FUEL CELL

This is a 371 national phase application of PCT/JP2006/317693 filed 31 Aug. 2006, which claims priority of Japanese Patent Application No. 2005-252458 filed 31 Aug. 2005, the contents of which are incorporated herein by reference.

TECHNICAL FIELD

The present invention relates to a fuel cell which comprises tubular fuel cells, specifically relates to a fuel cell which is capable to improve heat exchange efficiency of the tubular fuel cells.

BACKGROUND ART

In the conventional solid polymer electrolyte fuel cell (hereinafter, refer to as "PEFC (Polymer Electrolyte Fuel Cell)".), an electrical energy generated by an electrochemical reaction produced in a membrane electrode assembly (hereinafter, refer to as "MEA".) that comprising a plate electrolyte membrane and electrodes (a cathode and an anode) arranged on both sides of the electrolyte membrane is extracted to outside of the PEFC via separators arranged on both sides of the MEA. PEFC can be actuated in a low temperature region. Moreover, because of high energy conversion efficiency, short start-up time, and small-sized and lightweight system, it has attracted attention as a power source of a battery car or a portable power supply.

Meanwhile, a unit cell of the above PEFC comprises such constituent elements as an electrolyte membrane, a cathode and an anode consisting of at least a catalyst layer, and separators, and its theoretical electromotive force is 1.23 volts. However, such a low electromotive force is insufficient as a power source of a battery car or the like. Due to this, a stack PEFC (hereinafter, it may be simply described as "fuel cell".) configured by arranging end plates or the like on both ends of a stacked body, in which unit cells are stacked in series in the stacking direction, is normally used as a power source. In addition, in order to further improve electric power generation efficiency of the fuel cell, it is preferable to downsize the unit cells and to increase an area of electric-power generating reaction (output density) per unit area.

In order to improve the output density of the conventional plate fuel cell (hereinafter, sometimes refer to as "plate FC".) per unit area and to improve the electric power generation efficiency thereof, it is necessary to thin the above constituent elements of the plate FC. However, if thickness of the constituent elements of the plate FC is set to be equal to or less than predetermined thickness, functions, strength, and the like of each constituent element may possibly be lowered. For this reason, it is structurally difficult to increase the output density per unit area of the fuel cell having the above-described configuration to be equal to or more than the certain density.

From these view points, in recent years, studies about a tubular-type PEFC (hereinafter, sometimes refer to as "tubular PEFC".) has been conducted. A unit cell (hereinafter, sometimes refer to as "tubular cell".) of the tubular PEFC comprises a hollow-shaped MEA (hereinafter, it is simply described as "hollow MEA".) having a hollow-shaped electrolyte layer and hollow-shaped electrode layers respectively arranged inside and outside of the electrolyte layer. An electrochemical reaction is caused by supplying reaction gases (a hydrogen-based gas and an oxygen-based gas) to the inside and outside of the hollow MEA, and electrical energy generated by the electrochemical reaction is extracted to the outside via current collectors arranged inside and outside of the hollow MEA. Namely, the tubular PEFC facilitates extracting the electrical energy by supplying one of the reaction gas (a hydrogen-based gas or an oxygen-based gas) to the inside of the hollow MEA incorporated in each unit cell and the other reaction gas (an oxygen-based gas or a hydrogen-based gas) to the outside hollow MEA. In other words, since the tubular PEFC allows the outside of two adjacent unit cells to have the same reaction gas, it is possible to omit separators that have gas shielding function in the conventional plate PEFC. Accordingly, the tubular PEFC effectively enables to downsize the unit cell.

Several techniques related to the tubular fuel cell (hereinafter, it may simply refer to as "tubular FC".) such as tubular PEFC have been disclosed. For example, Published Japanese translations of PCT application No. 2004-505417 discloses an art configured by forming a modular electrochemical cell assembly by bundling a plurality of tubular fuel cells (microcells) and arranging cylindrical heat transfer pipes in the bundle. According to this, the art makes it possible to remove large amount of heat generated by the bundle of microcells.

However, the art disclosed in the Published Japanese translations of PCT application No. 2004-505417, as cooling pipe is in a cylindrical form, one of the tubular fuel cells and one of the cooling pipes contact each other on a line only, it is difficult to improve the cooling efficiency.

Accordingly, an object of the present invention is to provide a fuel cell which is capable to improve heat exchange efficiency with tubular fuel cells.

Disclosure of the Invention

In order to solve the above problems, the present invention takes the following means. The first aspect of the present invention is a fuel cell comprising: a plurality of tubular cells arranged in parallel; and heat exchangers arranged at the outside of the tubular cells, wherein at least a part of the outer circumferential surface of the tubular cells and the peripheral surface of the heat exchangers have face contact with each other.

In the first aspect of the invention, the wording "heat exchangers arranged at the outside of the tubular fuel cell" means that the heat exchangers are arranged so as to have face contact with at least a part of the outer circumferential surface of the tubular cells. In the invention (including the first aspect of the invention and below-described second aspect of the invention), the wording "heat exchanger" means a member having a heat medium passage inside thereof. When a cooling medium runs through the passage, the heat exchanger works as a cooling pipe for cooling the tubular cells. While, when a thermal medium runs through the passage, the heat exchanger works as a heating pipe for heating the tubular cells. Type of heat exchanger of the invention (including the first aspect of the invention and below-described second aspect of the invention) is not limited as long as it has a heat medium passage inside thereof. It is not only a cooling pipe having a single hollow, but also, as described later, it may include a type of heat exchanger in which a plurality of heat medium passages are provided and which is formed by connecting the thick wall portions of the plurality of tubular heat exchangers. Moreover, in the first aspect of the invention, number of the tubular cells to have face contact with a heat exchanger is not particularly limited. A heat exchanger may have face contact with single tubular fuel cell only, or it may have face contact with a plurality (e.g. four or more) of the tubular cells.

The second aspect of the present invention is a fuel cell comprising: a plurality of tubular cells arranged in parallel; and heat exchangers arranged at the outside of the tubular cells, wherein concaves to be directly contact with the outer circumferential surface of the tubular cells are provided onto the peripheral surface of the heat exchangers.

In the second aspect of the invention, the wording "heat exchangers arranged at the outside of the tubular cells" means that the heat exchangers are arranged so as to be in contact with at least a part of the outer circumferential surface of the tubular cells. More specifically, it means that the peripheral surface of one of the heat exchanger and the outer circumferential surface of one of the tubular cells are in line contact with by at least two lines or have face contact with each other. In addition, the wording "concaves to be directly contact with the outer circumferential surface of the tubular cells are provided onto the peripheral surface of the heat exchangers" means that the surface having concaves on which columnar tubular cells can be placed (hereinafter, refer to as "concave"). is provided at the peripheral surface of the heat exchangers. It also means that the concave and the outer circumferential surface of the tubular cells contact each other directly (refer to FIG. 8.). Examples of cross-sectional shape of the concave obtained by cutting in a plane including a direction normal to an axial direction of the heat exchanger include curve profile (refer to FIG. 8(A).), and a polygonal line (refer to FIG. 8(B).). Moreover, in the second aspect of the invention, similar to the first aspect of the invention, number of the tubular cells which have face contact with a heat exchanger is not particularly limited. A heat exchanger may have face contact with single tubular fuel cell only, or it may have face contact with a plurality (e.g. four or more) of the tubular cells.

Further, in the above second aspect of the invention, a cross section of the concaves obtained by cutting in a plane including a direction normal to an axial direction of the heat exchanger may be a polygonal line, and one of the concaves and the outer circumferential surface of one of the tubular cells are in line contact with each other by at least two lines.

In the above second aspect of the invention (including the variation), the outer circumferential surface of the tubular fuel cells and the concave both may be constituted to be curved surface.

Also, in the above second aspect of the invention wherein the outer circumferential surface of the tubular cells and the concaves are constituted to be curved surface, if a curvature radius of the outer circumferential surface of the tubular cells is defined as R1 and a curvature radius of the concave for receiving the tubular cells is defined as R2, a relation R2≦R1 may be given.

In these aspects of the invention (including the first and second aspects, and the variation thereof: hereinafter, same as this), a contact area of the outer circumferential surface of the tubular cells and the peripheral surface of the heat exchanger may be constituted to become 2% or more and 50% or less of the peripheral surface area of the heat exchanger.

In the invention, the wording "contact area is 2% or more and 50% or less of the peripheral surface area of the heat exchanger" means that an area of the peripheral surface of the heat exchanger having face contact with the outer circumferential surface of the tubular cells is 2% or more and 50% or less of the entire peripheral surface area of the heat exchanger. The wording "the entire peripheral surface area" means as follows: in the peripheral surface of a heat exchanger, if an area which contacts with the outer circumferential surface of the tubular cells is defined as "A"; and if another area which does not contact with the outer circumferential surface of the tubular cells is defined as "B", "the entire peripheral surface area" means the total area shown by "A+B". In other words, by using A and B, the condition of the above aspects of the invention can be represented by "0.02≦A/(A+B)≦0.5".

In the aspects of the above invention, reaction gas passages may be formed on the peripheral surface of the heat exchanger to have face contact with the tubular cells.

Further, in the aspects of the above invention, the reaction gas passages may be formed in a direction crossing an axial direction of the tubular cell.

In the aspects of the above invention, the heat exchanger may be disposed in an aperture formed by a plurality of the tubular cells arranged in parallel.

Also, in the aspects of the above invention, a plurality of the heat medium passages may be provided inside the heat exchanger.

In the aspects of the above invention, the peripheral surface of the heat exchanger and the outer circumferential surfaces of four or more of the tubular cells may be arranged to contact each other.

In addition, in the aspects of the above invention, the heat exchanger may have electric conducting property.

In the aspects of the above invention, the heat exchanger may be constituted by an electroconductive material of which outer surface is plated by a precious metal.

Examples of the precious metal include platinum, and gold.

Moreover, in the aspects of the above invention, a cooling medium runs inside of the heat exchanger, at least a part of inner surface to be contacted with the cooling medium may be constituted by an electrical insulating material.

Examples of the cooling medium include water, but also ethylene glycol, and so on.

Furthermore, in the aspects of the above invention, the electrical insulating material may be a silicone rubber.

Effects of the Invention

According to the first aspect of the present invention, since one of the tubular cells and one of the heat exchangers are having face contact with each other, compared with the conventional art that the outer circumferential surface of these tubular cells are in only one line contact with the heat exchanger, it is possible to significantly improve heat exchange efficiency of the tubular cells. Therefore, according to the first aspect of the invention, it is capable to provide a fuel cell which can improve heat exchange efficiency of the tubular cells.

According to the second aspect of the present invention, since one of the tubular cells and one of the heat exchangers are in line contact with each other by at least two lines or have face contact, compared with the conventional art that the outer circumferential surface of these tubular cells are only in line contact with the heat exchanger, it is possible to significantly improve heat exchange efficiency of the tubular cells. Therefore, according to the second aspect of the invention, it is capable to provide a fuel cell which can improve heat exchange efficiency of the tubular cells.

In the second aspect of the invention, since a cross-section of the concaves obtained by cutting in a plane including a direction normal to an axial direction of the heat exchanger is a polygonal line, and one of the concaves and the outer circumferential surface of one of the tubular cells are in line contact with each other by at least two lines, it is capable to improve heat exchange efficiency of the tubular cells.

In the second aspect of the invention, even if the outer circumferential surface of the tubular cells and the concave are curved surface, it is possible for the outer circumferential surface of one of the tubular cells and the peripheral surface (concave) of one of the heat exchangers to be in line contact with each other by at least two lines or to have face contact. Accordingly, by having the constitution, it is capable to improve heat exchange efficiency of the tubular cells.

In the second aspect of the above invention of which concave to be provided with the outer circumferential surface of the tubular cells and with the heat exchanger, as a relation R2≦R1 is given between the curvature radius R1 of the outer circumferential surface of the tubular cells and the curvature radius R2 of the concave, the outer circumferential surface of one of the tubular cells and the peripheral surface (concave portion) of one of the heat exchangers can be in line contact with each other by at least two lines or to have face contact.

In the aspect of the above invention, contact area of the outer circumferential surface of the tubular cells and the peripheral surface of the heat exchanger is set to 2% or more and 50% or less of the peripheral surface area of the heat exchanger. Thereby, it is capable to improve heat exchange efficiency of the tubular cells, and to improve supply efficiency of gases to be supplied to the tubular cells. Accordingly, the aspect of the invention is capable to provide a fuel cell that can improve power generation efficiency.

In addition, in the aspect of the above invention, when the outer circumferential surface of the tubular cells and the peripheral surface of the heat exchangers have face contact with each other because of the reaction gas passages being formed in the peripheral surface of the heat exchangers, it is capable to supply reaction gases to the outer circumferential surface of the tubular cells via these reaction gas passages. Therefore, according to the aspect of the invention, it is possible to provide a fuel cell capable to inhibit the decline in diffusion of reaction gases and to improve heat exchange efficiency of the tubular cells.

Moreover, in the aspect of the above invention, as reaction gas passages are formed in a direction crossing the axial direction of the tubular cells, it becomes possible to diffuse the reaction gases in high flow velocity and to decrease the pressure loss of the reaction gases.

In the aspect of the above invention, by disposing heat exchangers in apertures formed by a plurality of the tubular cells arranged in parallel, it is capable to improve heat exchange efficiency and to downsize the fuel cell.

Further, in the aspect of the above invention, by having a configuration such that a plurality of the reaction gas passages are provided inside the heat exchangers, it is capable to have a configuration formed by connecting the thick wall portion of the heat exchangers to the other heat exchangers. If the heat exchangers have such a configuration, reaction gas passages in the peripheral surface of the heat exchanger can be continuously formed. Thereby, it is possible to easily diffuse reaction gases in high flow velocity and to easily decrease pressure loss of the reaction gases.

In the aspect of the above invention, as the peripheral surface of the heat exchangers and the outer circumferential surface of four or more of the tubular cells are arranged to contact with each other, it is capable to improve heat exchange efficiency and to downsize the fuel cell.

In the aspect of the above invention, as heat exchangers arranged at the outside of the tubular cells have electric conducting property, it is capable to let the heat exchangers to have a function as a current collector. Hence, according to the aspect of the invention, it is capable to provide a fuel cell that can improve current collection efficiency.

In addition, in the aspect of the above invention, since the surface of the heat exchanger to contact with the cooling medium is constituted by the electrical insulating material, together with the above-mentioned effects, it is capable to provide a fuel cell which can inhibit current leakage and improve the electric power generation efficiency.

Furthermore, in the aspect of the above invention of which surface of the heat exchanger which is to contact the cooling medium is constituted by electrical insulating material, by using silicone rubber as an electrical insulating material, it is capable to inhibit current leakage and easily improve electric power generation efficiency.

BRIEF DESCRIPTION OF THE DRAWINGS

FIG. 8(A) is a schematic view showing a configuration of a concave having curved surface; FIG. 8(B) is a schematic view showing a configuration of a concave having polygonal line.

Figure 1:
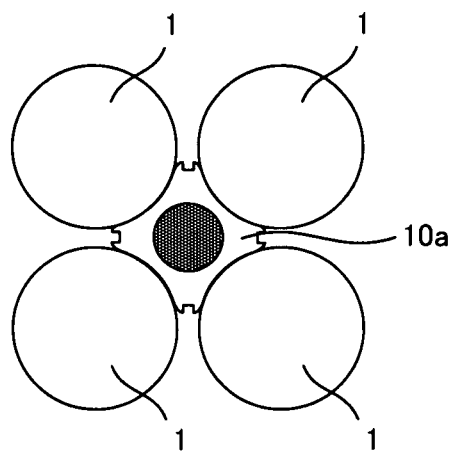
FIG. 1(A) is a schematic view showing the fuel cell of the present invention.
FIG. 1(B) is a schematic view showing the fuel cell of the conventional invention as a comparison.
Figure 1:
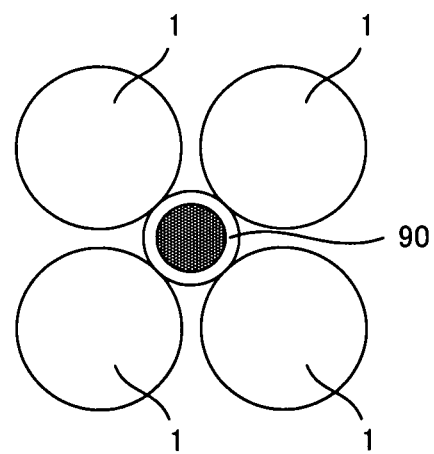

In the attached drawings, reference numeral 1 indicates a tubular fuel cell, 10a and 10b indicate cooling pipes (heat exchangers), 11 and 12 indicate reaction gas passages, 13 indicates a hole, 15a and 15b indicate apertures, 16 and 17 indicate concaves to be arranged in the heat exchangers, 20 indicates a pipe member, 21a and 21b indicate plate members.

Best Mode for Carrying Out the Invention

In order to improve output density per unit volume, studies about tubular FC has been proceeded. In the tubular FC, same as a plate FC, its optimal temperature range for the electrochemical reaction is determined depending on the kinds of electrolyte (for example, around 100° C. for PEFC). Therefore, so as to improve the electric power generation efficiency, it is necessary to cool the cells of the tubular FC and to control temperature of the cells within the predetermined range. Meanwhile, in view of improving the cold start performance of the fuel cells, at a time of start-up of the fuel cell, warming-up of the tubular cells is sometimes necessary. Therefore, the tubular FC has a heat exchanger (hereinafter, sometimes refer to as "cooling pipe".) to cool/heat the cells of the tubular FC. However, conventional cooling pipe is in a cylindrical form, the cooling pipe is in contact with the tubular cells by only one line. Thus, contact area of the outer circumferential surface of the cooling pipe and outer circumferential surface of the tubular cells is small; thereby heat exchange efficiency tends to be deteriorated. In order to improve heat exchange efficiency of the tubular cells, especially, to improve cooling efficiency thereof, the contact area between the cells and the cooling pipe must be enlarged.

Accordingly, an object of the present invention is to provide a fuel cell which is capable to cool/heat the tubular cells and to improve the heat exchange efficiency via the heat exchangers configured by having face contact with or being in line contact by at least two or more lines with the tubular cells. Here, if the tubular cells and the heat exchangers are contacted with each other in the above configuration, there is a fear that diffusion of the reaction gases to the outer circumferential surface might be interrupted. Because of this, in the present invention, by forming reaction gas passages on the peripheral surface of the heat exchangers, diffusion of reaction gases are secured and heat exchange efficiency is improved. Moreover, by arranging the heat exchangers having such a configuration in apertures formed by the adjacent tubular cells arranged in parallel, it is capable to improve the heat exchange efficiency and to downsize the fuel cell. In addition, if the heat exchangers are constituted by an electroconductive material, it becomes possible to let the heat exchangers to have a function as a current collector. Accordingly, it is capable to further improve the current collection efficiency and to downsize the fuel cell.

The fuel cell of the present invention will be described in detail below with reference to the drawings. In the description, the heat exchanger is used as a cooling pipe by circulating the cooling medium inside the heat exchanger; nevertheless, the heat exchanger also can be used for heating tubular cells by circulating the heat medium inside the heat exchanger.

In order to make the understanding of the invention easier, difference between a conventional fuel cell and the fuel cell of the present invention will be described with reference to FIGS. 1(A) and 1(B).

FIG. 1(A) is a schematic view showing the fuel cell of the present invention, and FIG. 1(B) is a schematic view showing the fuel cell of the conventional invention as a comparison. FIG. 1(A) is a front view schematically showing an arrangement of the tubular cells and the cooling pipe in the fuel cell of the present invention. While, FIG. 1(B) is a front view schematically showing an arrangement of the tubular fuel cell and the cooling pipe in a conventional fuel cell. As seen from FIG. 1(A), the peripheral surface of a cooling pipe 10a of the invention is formed in a configuration which is capable to have face contact with the outer circumferential surface of the tubular cells 1, 1, 1, 1. Each tubular cell 1, 1, 1, 1 and the cooling pipe 10a have face contact with each other. On the other hand, as shown in FIG. 1(B), even if cylindrical form of the conventional cooling pipe 90 is disposed in an aperture formed by a plurality of the tubular cells 1, 1, 1, 1 arranged in parallel, since the cooling pipe 90 and the tubular cell 1 are both in a cylindrical form (tubular shape), these are adjacent only on lines (line contact). As it were, in the conventional fuel cell, contact area of the cooling pipe and the tubular cells is remarkably smaller than that of the present invention; thereby it is difficult to improve the cooling efficiency.

Figure 2:
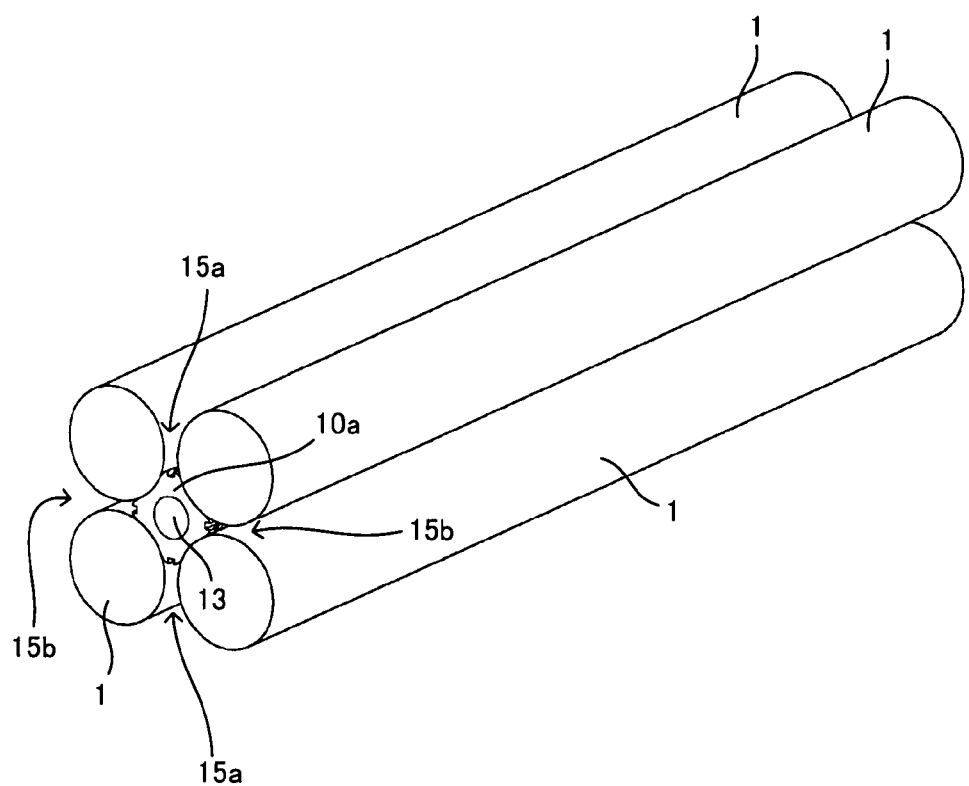
FIG. 2 is a perspective view showing tubular cells and a cooling pipe to be arranged in the fuel cell of the first embodiment of the invention.
Figure 3:
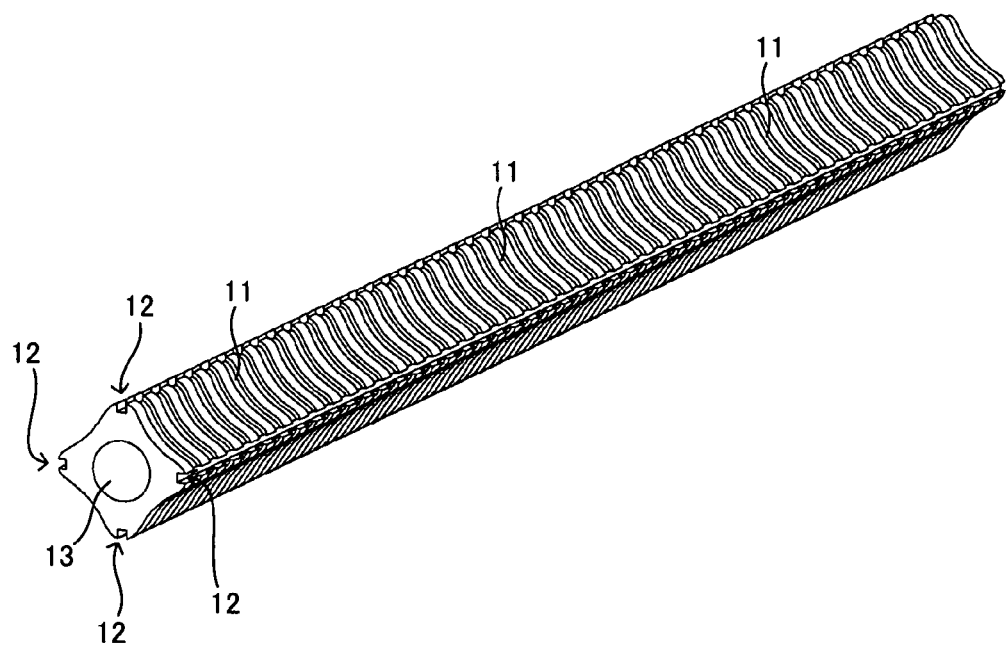
FIG. 3 is a perspective view showing the cooling pipe of the first embodiment of the invention.

FIG. 2 is a perspective view showing tubular cells and a cooling pipe to be arranged in the fuel cell of the first embodiment of the invention. FIG. 3 is a perspective view showing the cooling pipe shown in FIG. 2. In FIGS. 2 and 3, elements adopting the same constitution as that of the fuel cell shown in FIG. 1 have the same reference numerals as those used in FIG. 1, and the description to each element is omitted. Hereinafter, the fuel cell of the first embodiment of the present invention will be described with reference to FIGS. 2 and 3.

As shown in FIG. 2, the cooling pipe 10a arranged in the fuel cell of the first embodiment of the invention is disposed in an aperture formed by the adjacent tubular cells arranged in parallel. The cooling pipe 10a, for example, is formed such that a plurality of plate members consisting of an electroconductive material (e.g., Ti, and so on) and on which peripheral surface a precious metal is plated (e.g., Au plating) are fixed (or the like) to a tubular member consisting of an electroconductive material (e.g., Ti and so on) and on which peripheral surface a precious metal is plated (e.g., Au plating) by spacing a predetermined distance between the plate members. Inside the hole 13 formed in the cooling pipe 10a having a similar length to the length in an axial direction of the tubular cells 1, 1, 1, 1, an electrical insulating tubular member (e.g., silicone rubber made pipe, and so on) is arranged, and cooling medium such as water runs inside the members. Then, by having face contact between the peripheral surface of the cooling pipe 10a cooled by the cooling medium and the outer circumferential surface of the tubular cells 1, 1, 1, 1, it is capable to efficiently cool down these four tubular cells 1, 1, 1, 1.

As shown in FIG. 3, in the peripheral surface of the cooling pipe 10a of the first embodiment, both in a crossing direction to the axial direction of the pipe and in a parallel direction to the axial direction of the pipe, reaction gas passages 11, 11, . . . and 12, 12, . . . are formed. Through these reaction gas passages 11, 11, . . . and 12, 12, . . . , reaction gas is supplied to the outer circumferential surface of the tubular cells 1, 1, . . . In this way, if reaction gas passages 11, 11, . . . and 12, 12, . . . are formed in the peripheral surface of the cooling pipe 10a, not only to the outer circumferential surface of the tubular cells 1, 1, 1, 1 faced to the apertures 15a, 15a, 15b, 15b, but also to the outer circumferential surface of the tubular cells 1, 1, 1, 1 faced to the peripheral surface of the cooling pipe 10a, reaction gas can be supplied. Therefore, it is capable to avoid the decline of electric power generation efficiency due to the undersupply of reaction gases. In other words, by disposing the cooling pipe 10a having the particular configuration in the aperture between the tubular cells 1, 1, 1, . . . adjacent in parallel, it is capable to provide a fuel cell which can maintain the diffusion of the reaction gases and improve the cooling efficiency. Further, to the cooling pipe 10a of the first embodiment, reaction gas passages are formed not only in a direction crossing to the axial direction but also in a direction parallel to the axial direction. Thus, for instance, the droplet water, which is produced such that the water vapor produced in each tubular cells 1, 1, . . . contacts with the cooling pipe 10a, is moved along the reaction gas passages 11, 11, . . . to collect the droplet water into the reaction gas passages 12, 12, . . . ; then, discharge of the droplet water collected in the reaction gas passages 12, 12, . . . to the outside can be possible.

As described above, the cooling pipe 10a consists of an electroconductive material, the cooling pipe 10a has face contact with each tubular cell 1, 1, 1, 1. Because of this, with this cooling pipe 10a, it is capable to collect the electric current in the circumferential direction and the axial direction of the outer circumferential surface of the tubular cells 1, 1, 1, 1. Hence, when the cooling pipe 10a is allowed to function as a current collector, the constitution of the fuel cell can be simplified. Moreover, depending on the cooling pipe 10a having face contact with the tubular cells 1, 1, 1, 1, it is capable to improve the current collection efficiency.

In the configuration shown in FIG. 3, as a result of forming the reaction gas passages 11, 11, . . . and reaction gas passages 12, 12, . . . to the peripheral surface of the cooling pipe 10a, the structure by which the outer circumferential surface of the tubular cells 1, 1, . . . and the peripheral surface of the cooling pipe 10a have face contact with each other may be found that it is a structure formed by that a plurality of the concaves (hereinafter, in the description of FIG. 3, simply refer to "concave".) formed at the top of a plurality of convex portions being sandwiched by the reaction gas passages 11, 11, . . . and the outer circumferential surface of the tubular cells 1, 1, 1, 1 contact each other. Namely, in the invention, the wording "have face contact" means a concept which includes a configuration that a plurality of concaves arranged so as the peripheral surface of the cooling pipe 10a and the outer circumferential surface of the tubular cells 1, 1, . . . to contact each other. By having face contact of the peripheral surface of the cooling pipe 10a in such a configuration with the outer circumferential surface of the tubular cells 1, 1, . . . , it is capable to improve the cooling efficiency. By the way, in FIG. 3, shown is a configuration that the plurality of concaves sandwiched between the reaction gas passages 11, 11, . . . formed in the direction crossing to the axial direction of the pipe and the outer circumferential surface of the tubular fuel cell 1, 1, . . . have face contact with each other. Nevertheless, the present invention may have a configuration, in which a plurality of concaves formed at the top of a plurality of convex portions being sandwiched by the reaction gas passages in a direction parallel to the axial direction of the pipe and the outer circumferential surface of the tubular cells have face contact with each other. Further, the invention may also have another configuration, in which a plurality of concaves formed at the top of a plurality of island convex portions, which is surrounded by the reaction gas passages formed in the crossing direction to the axial direction of the pipe and the reaction gas passages formed by the direction parallel to the axial direction of the pipe, and the outer circumferential surface of the tubular cells have face contact with each other.

Figure 4:
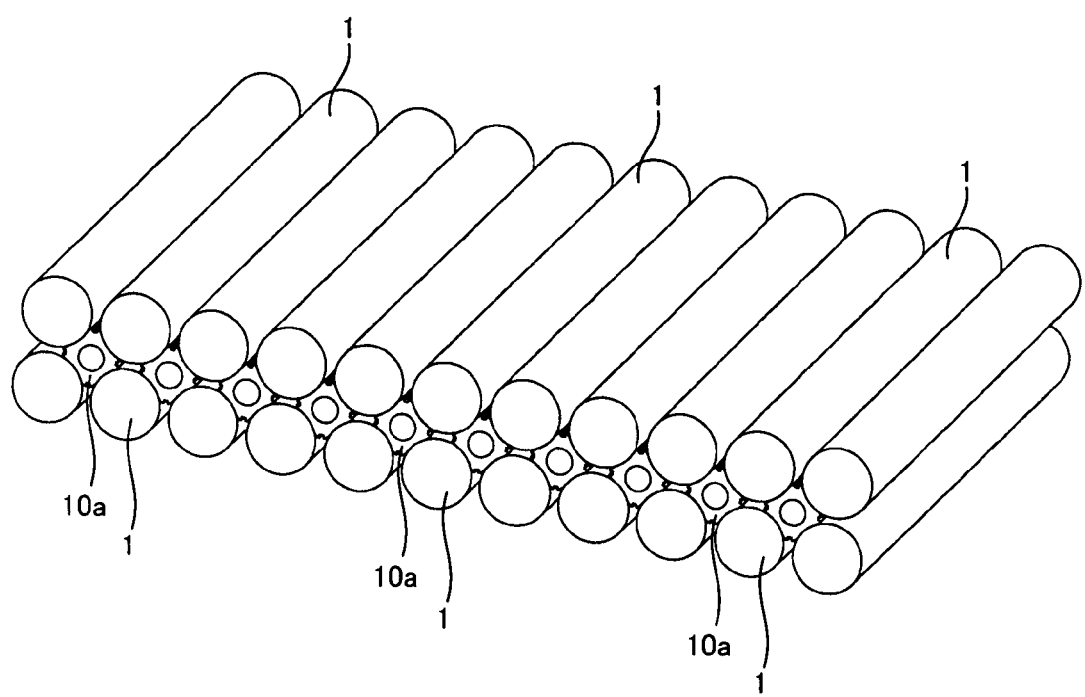
FIG. 4 is a perspective view showing the tubular cells and the cooling pipe to be arranged in the fuel cell of the first embodiment of the invention.

FIG. 4 is a perspective view showing the tubular cells and the cooling pipe to be arranged in the fuel cell of the first embodiment of the invention. As shown in FIG. 4, in the fuel cell of the first embodiment, the tubular cells 1, 1, . . . and the cooling pipe 10a are arranged so as to have a configuration where the cooling pipes 10a are disposed into all the apertures formed by each unit consisting of four tubular cells 1, 1, 1, 1. By having such a configuration, it is capable to secure the diffusion of reaction gases and to efficiently cool all of the tubular cells 1, 1, . . . . When the tubular cells 1, 1, . . . are stacked up in the up-and-down direction of the drawing, same as above, the tubular cells and the cooling pipes may be disposed so as have a configuration where the cooling pipes 10a are disposed into all the apertures formed by each unit consisting of four tubular cells 1, 1, 1, 1.

In the above description, described is a cooling pipe 10a configured by forming reaction gas passages 12, 12, . . . in a direction parallel to the axial direction on end faces opposing to the apertures 15a, 15a, 15b, 15b. The areas where the reaction gas passages 12, 12, . . . are formed are not limited to the above area; these may be formed on faces opposing to the outer circumferential surface of the tubular cells 1, 1, . . . . In addition, in the above description, the configuration where cooling pipes are disposed into all of the apertures formed by the tubular cells is shown, the fuel cell of the invention is not limited to the configuration, it may be configured by disposing the cooling pipes to a particular part of the apertures.

Figure 5:
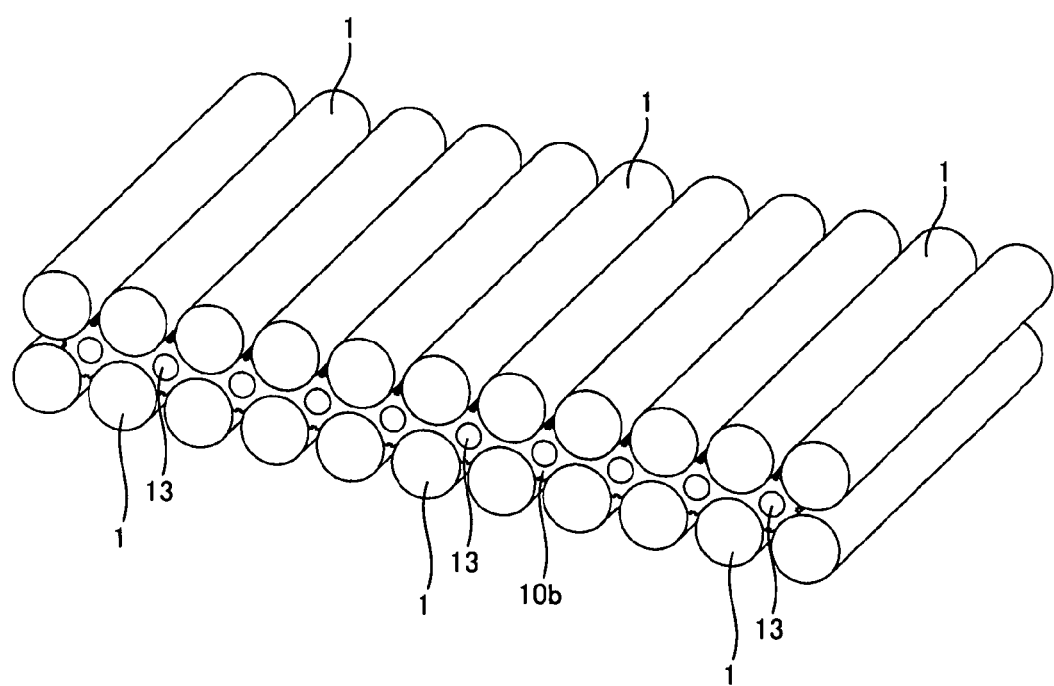
FIG. 5 is a perspective view showing the tubular cells and the cooling pipe to be arranged in the fuel cell of the second embodiment of the invention.
Figure 6:
FIG. 6 is a top view showing a configuration of a cooling pipe of the second embodiment of the invention.

FIG. 5 is a perspective view schematically showing the tubular cells and the cooling pipe to be arranged in the fuel cell of the second embodiment of the invention. FIG. 6 is a top view schematically showing a configuration of a cooling pipe of the second embodiment of the invention. In FIGS. 5 and 6, elements having the same constitution as those of the fuel cell of the invention shown in FIG. 2 adopt the same reference numerals as those in FIG. 2, and the description thereof is omitted. Hereinafter, the fuel cell of the second embodiment of the present invention will be described with reference to FIGS. 5 and 6. The cooling pipe shown in the drawings are formed by having the electroconductive material (e.g., Cu, and so on) of which surface is plated with a precious metal (e.g., Au plating), for example.

As shown in FIG. 5, the cooling pipe 10b arranged to the fuel cell of the second embodiment of the invention has a wave-like configuration such that a plurality of the cooling pipes 10a shown in FIG. 3 are integrally connected in the right-and-left direction of the drawing, wherein reaction gas passages are formed on the surface. Then, inside the plurality of holes 13, 13, . . . , electrical insulating tubular members (e.g., silicone rubber made pipe, and so on) are formed, cooling medium such as water runs inside of the members. Accordingly, even if the cooling pipe 10b of the invention has such a configuration, since the cooling pipe 10b and the plurality of tubular fuel cells 1, 1, . . . have face contact with each other, it is capable to provide a fuel cell which can improve the cooling efficiency of the tubular cells 1, 1, . . . .

Also, as shown in FIG. 6, since the reaction gas passages 11, 11, . . . are continuously formed in a direction parallel to the axial direction in the peripheral surface the cooling pipe 10b of the second embodiment, according to the fuel cell of the second embodiment, it is capable to diffuse reaction gases in high flow velocity to the direction crossing to the axial direction and to decrease the pressure loss of the reaction gases. When reaction gases are diffused in high flow velocity, droplet water which is possible to exist in the reaction gas passages can be easily removed by the reaction gas; thereby occurrence of flooding can be effectively inhibited.

Further, same as the cooling pipe 10a of the first embodiment, the cooling pipe 10b of the second embodiment is formed by an electroconductive material; the cooling pipe 10b has face contact with a plurality of tubular cells 1, 1, . . . each other. Therefore, current collection in the outer circumferential surface of the tubular cells 1, 1, . . . can be done by the cooling pipe 10b. Hence, the fuel cell of the second embodiment can also make the constitution of the fuel cell simple and improve the current collection efficiency.

In the description of the above fuel cell of the second embodiment, the cooling pipe 10b only having the reaction gas passages 11, 11, . . . formed in a direction crossing to the axial direction is described, the configuration of the cooling pipe of the invention is not limited to this, reaction gas passages may be formed in a direction parallel to the axial direction. However, if the reaction gas passages are formed in the direction parallel to the axial direction in the peripheral surface of the integrally formed cooling pipe 10b of the second embodiment, flow of the reaction gases is disturbed at the crossing points of the reaction gas passages and another reaction gas passages formed in a direction crossing to the axial direction of the heat exchanger. Thereby, the pressure loss increases and flow velocity of the reaction gases may be decreased. Therefore, in view of having high flow velocity and pressure-loss reduction effect of the reaction gases, the fuel cell of the second embodiment preferably has a constitution consisting of a cooling pipe 10b wherein reaction gas passages 11, 11, . . . is formed only in the crossing direction to the axial direction.

In the description of the fuel cell of the first and second embodiments of the present invention, configurations in which electrical insulating tubular members are arranged to the holes 13, 13, . . . of the cooling pipe 10a, 10b are described, the invention is not limited to the configurations. When an electrical insulating member is arranged in each of the holes 13, 13, . . . , for example, a part of the surface only of the holes 13, 13, . . . may be coated by an electrical insulating material. If the electrical insulating material is provided in the holes 13, 13, . . . , electric conducting property and thermal conductive property of the cooling pipe 10a, 10b may be declined. While, if the electrical insulating material is not provided, current leakage is possibly occurred. Therefore, to arrange or not to arrange the electrical insulating members in the holes 13, 13, . . . is preferably suitably determined based on the comprehensive consideration of these properties. By the way, as described above, if the electrical insulating material is provided to the holes 13, 13, . . . , there is a fear of decline of the thermal conductance of the cooling pipes 10a, 10b. So, when the holes 13, 13, . . . are coated by the electrical insulating material, it is preferable to select a material having electrical insulation and preferable thermal conductance (e.g., tube or the like formed by high thermal-conductive silicone rubber). On the other hand, when securing the electric conducting property and thermal conductance of the cooling pipe is considered more important, it is possible to have a configuration where the electrical insulating material is not provided to the holes 13, 13, . . . of the cooling pipe.

In the above description, a cooling pipe of which surface having an electroconductive material is plated by a precious metal is described; the cooling pipe of the invention is not limited by this configuration. As long as the cooling pipe has a certain corrosion-resistance and strength to the operational environment of the fuel cell, the constituent material can be suitably selected. Examples of the constituent material having the favorable corrosive-resistance include gold, platinum, titanium, stainless steel, and the like. If the corrosive-resistance is insufficient with titanium or stainless steel, the surface of the cooling pipe constituted by the above materials is preferably coated (plated) thereon by materials for improving the corrosive-resistance (e.g., gold, platinum, etc.)

Further, when the cooling pipe is designed to have a function as a current collector together with the above functions, the cooling pipe preferably consists of favorable electroconductive material. Examples of the favorable electroconductive material include gold, platinum, copper, and the like. If the cooling pipe is formed by copper, since copper is not corrosive-resistant to the operational environment of the fuel cell, it is difficult to use it as it is for the cooling pipe of the invention. Because of this, in such a case, for instance, by coating (plating) the surface of the copper-made cooling pipe with a material (e.g., precious metal such as gold, platinum, etc.) having favorable corrosive-resistance and electric conducting property, the corrosive-resistance must be improved. Specific examples of the methods for improving the electric conducting property of the cooling pipe formed by the above materials which has favorable corrosive-resistance may be, in addition to the above coating method, a method for arranging materials having a favorable electric conducting property in a thick wall portions of the cooling pipe (e.g., by constituting the center, as a multilayer structure with the same material, of the cooling pipe for stuffing wire rods consisting of the same material).

The method for manufacturing the cooling pipe 10a of the above first and second embodiments are not particularly limited; for example, the cooling pipe 10a can be manufactured by casting a material in molten state into a mold which is capable to form the specific configuration of cooling pipe 10a. However, by this method, it is seemingly difficult to form the reaction gas passages with a high degree of precision. So, other manufacturing method of the cooling pipe of the present invention will be described as follows.

Figure 7:
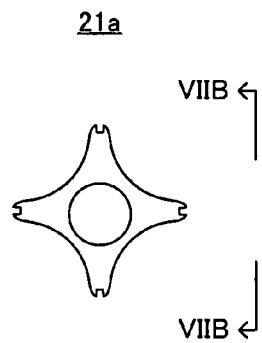
FIGS. 7(A)~7(E) are schematic views showing members constituting the cooling pipe of the invention.
Figure 7:
Figure 7:
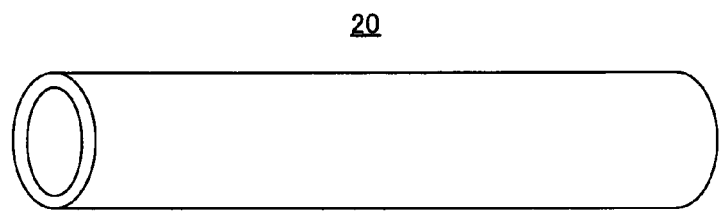
Figure 7:
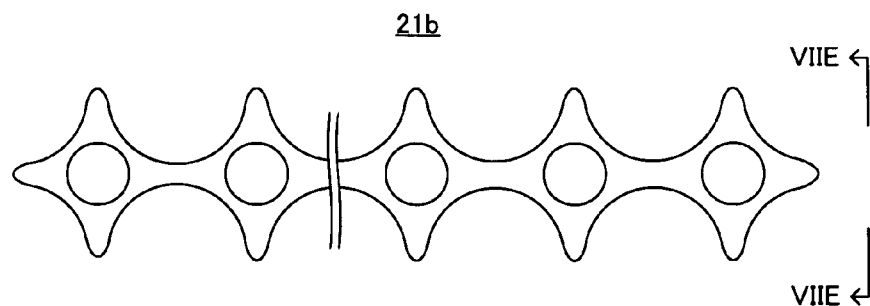
Figure 7:
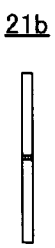

FIGS. 7(A)~7(E) are schematic views showing members constituting the cooling pipe of the invention. FIG. 7(A) is a front view of a member constituting the cooling pipe 10a of the first embodiment. FIG. 7(B) is a side view of the member shown in FIG. 7(A) seen from the arrows VIIB, VIIB. FIG. 7(C) is a perspective view of a pipe member having a hole for constituting the first and second embodiments. FIG. 7(D) is a front view of a member for constituting the cooling pipe 10b of the second embodiment. FIG. 7(E) is a side view of the member shown in FIG. 7(D) seen from the arrows VIIE, VIIE.

By fixing a plurality of plate members 21a, 21a, . . . shown in FIGS. 7(A) and 7(B) at regular intervals in one direction onto the peripheral surface of the pipe member 20 shown in FIG. 7(C), it is capable to manufacture the cooling pipe 10a of the first embodiment. When the pipe member 20 and plate members 21a, 21a, . . . are both made from metal, a specific example of the above fixing method may be welding.

While, by arranging a plurality of the plate members 21b, 21b, . . . shown in FIGS. 7(D) and 7(E) at regular intervals in one direction, then fixing the pipe member 20 shown in FIG. 7(C) into the holes opened in each plate member 21b, it is capable to manufacture the cooling pipe 10b of the second embodiment. When the pipe member 20 and the plate members 21b, 21b, . . . are both made from metal, a specific example of the above fixing method may be welding.

In the above description of the present invention, an example of fuel cell, in which tubular cells 1, 1, . . . are arranged in a form of grid and a cooling pipe is arranged to the apertures formed by these tubular cells 1, 1, . . . , are described. In the invention, arrangement of the tubular cells is not limited to the above configurations, it may be in a form of honeycomb. When the tubular cells are arranged in the honeycomb form, layout of the apertures formed by the tubular cells is different from that shown in the drawings. In such a case, cooling pipes formed into a shape, which is capable to be arranged to the modified apertures, may be provided to make a fuel cell. However, if the tubular cells are arranged in a honeycomb form, pressure loss of the reaction gases increases, flow velocity of the reaction gases decreases and the flooding inhibiting effect decreases, further, the above-mentioned individual apertures become smaller, space for the passage of cooling medium running through the cooling pipes becomes smaller; there is a fear of decrease of cooling efficiency improvement effect. In order to avoid such effects, in view of decrease of pressure loss of the reaction gas, obtaining the sufficient flooding inhibiting effect, and easily improving the cooling efficiency, a fuel cell having tubular fuel cell arranged in a form of grid is preferable. The cooling medium running through the cooling pipes of the invention is not limited to water: it may be any other cooling mediums such as ethylene glycol.

In the invention, from the viewpoint of improving the cooling efficiency of the tubular cells, it is preferable to enlarge the contact area (hereinafter, sometimes refer to as "contact area A".) between the peripheral surface of the cooling pipe and the outer circumferential surface of the tubular cells. While, from the viewpoint of easy diffusion of the reaction gas to the outer circumferential surface of the tubular cells, it is preferable to reduce the contact area A between the peripheral surface of the cooling pipe and the outer circumferential surface of the tubular cells, and to enlarge the non-contact area (an area of cooling pipe outer circumferential surface, which does not contact to the outer circumferential surface of the tubular cells; hereinafter, sometimes refer to as "non-contact area B".). Nevertheless, if the non-contact area B is enlarged too much, it is not possible to achieve the object of the present invention, i.e. improvement of cooling efficiency of the tubular fuel cell. Accordingly, in the present invention, ratio of the contact area A and the non-contact area B is preferably adjusted to a ratio which is capable to improve electric power generation efficiency of the entire fuel cells. In view of improving cooling efficiency of the tubular cells, contact area A is preferably set to 2% or more of the entire area of the peripheral surface of the cooling pipe (A+B). Also, in view of securing the diffusion efficiency of the gas, contact area A is preferably set to 50% or less of the entire area of the peripheral surface of the cooling pipe (A+B). Consequently, in the present invention, it is preferably $0.02 \leq A/(A+B) \leq 0.5$, more preferably $0.2 \leq A/(A+B) \leq 0.4$.

Figure 8:
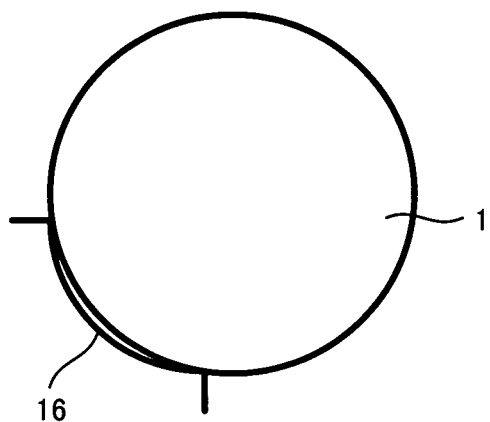
FIGS. 8(A) and 8(B) are scale-upped cross-sectional views showing one of the concaves arranged to the heat exchanger and one of the tubular cells.
Figure 8:
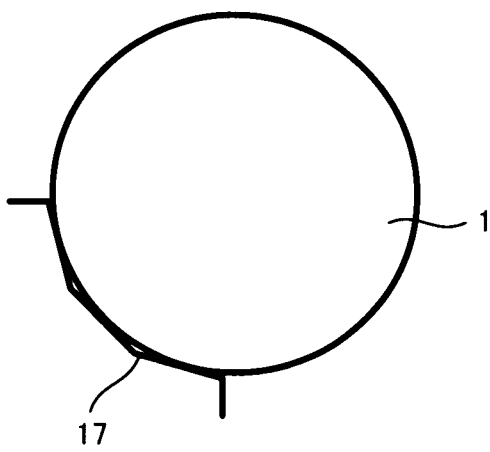

Moreover, in the above description (FIGS. 1(A), 1(B), 2~6, 7(A)~7(E), and the description thereof) of the invention, concave of the heat exchanger in a form of curved surface having a curvature radius which is substantially same as the outer circumferential surface of the tubular cells is shown; however, the heat exchanger of the invention is not limited to the configuration. In FIGS. 8(A) and 8(B), other possible configurations that the concave of the heat exchanger may have are shown. FIGS. 8(A) and 8(B) are a scale-upped cross-sectional view showing one of the concaves arranged to the heat exchanger and one of the tubular cells, the cross-sectional view of concaves is obtained by cutting in a plane including a direction normal to the axial direction of the heat exchanger. FIG. 8(A) shows a schematic configuration of a concave 16 having curved surface; FIG. 8(B) shows a schematic configuration of a concave 17 having polygonal line. In FIGS. 8(A) and 8(B), elements adopting the same constitution of the fuel cell shown in FIG. 1 adopt the same reference numerals as those used in FIG. 1, and the description to each element is omitted. When a curvature radius of the outer circumferential surface of the tubular cell 1 shown in FIG. 8(A) is defined as R1 and curvature radius of the concave 16 is defined as R2, the concave 16 of the heat exchanger of the present invention can be expressed as $R2 \leq R1$. As shown in FIG. 8(A), when $R2<R1$, the concave 16 and the outer circumferential surface of the tubular cell 1 can be in line contact with each other by at least two lines; and when $R2=R1$, the concave 16 and the outer circumferential surface of the tubular cell 1 can have face contact with each other. On the other hand, as seen from the cross-sectional view in FIG. 8(B), even if the cross-sectional shape of the concave 17 is polygonal line, the concave 17 and the outer circumferential surface of the tubular cell 1 may have line contact each other by at least two or more lines. Thereby, even if the fuel cell has a configuration in which heat exchanger having concave 17 of which cross-sectional view is shown in FIG. 8(B), it is possible to significantly improve the heat exchange efficiency of the tubular cells.

Industrial Applicability

As seen above, the fuel cell of the present invention is suitably used for power source of a battery car or a portable power supply, for example.

The invention claimed is:

1. A fuel cell comprising:
   a plurality of tubular cells arranged in parallel, each of said tubular cells having a first end and a second end; and
   a heat exchanger arranged at an outside of said tubular cells, said heat exchanger comprising a plurality of plates having concave sides,
   wherein a first plate of said plurality of concave sided plates is adjacent to the first ends of said plurality of tubular cells,
   wherein a second plate of said plurality of concave sided plates is adjacent to the second ends of said plurality of tubular cells,
   wherein the remainder of said plurality of concave sided plates are arranged between said first plate and said second plate,
   wherein at least a part of an outer circumferential surface of each of said tubular cells and a peripheral surface of each of said plurality of concave sided plates of said heat exchanger have face contact with each other over a surface area greater than a single line of contact.

2. The fuel cell according to claim 1, wherein a contact area of said outer circumferential surface of said tubular cells and the peripheral surface of said heat exchanger is 2% or more and 50% or less of the peripheral surface area of said heat exchanger.

3. The fuel cell according to claim 1, wherein reaction gas passages are formed on said peripheral surface of said heat exchanger to have face contact with said tubular cells.

4. The fuel cell according to claim 3, wherein said reaction gas passages are formed in a direction crossing an axial direction of said tubular cell.

5. The fuel cell according to claim 1, wherein said heat exchanger is disposed in an aperture formed by a plurality of said tubular cells arranged in parallel.

6. The fuel cell according to claim 1, wherein a plurality of heat medium passages are incorporated inside said heat exchanger.

7. The fuel cell according to claim 1, wherein said peripheral surface of said heat exchanger and said outer circumferential surfaces of four or more of said tubular cells are arranged to contact each other.

8. The fuel cell according to claim 1, wherein said heat exchanger has electric conducting property.

9. The fuel cell according to claim 8, wherein said heat exchanger is constituted by an electro-conductive material of which outer surface is plated by a precious metal.

10. The fuel cell according to claim 1, wherein a cooling medium runs inside said heat exchanger, and at least a part of an inner surface of said heat exchanger, which contacts with said cooling medium, is constituted by an electrical insulating material.

11. The fuel cell according to claim 10, wherein said electrical insulating material is a silicone rubber.

12. A fuel cell comprising:
    a plurality of tubular cells arranged in parallel; and
    heat exchangers arranged to be adjacent to the plurality of tubular cells, a peripheral surface of each of the heat exchangers having a plurality of concaved portions, each of said concaved portions being in contact with one of said plurality of tubular cells,
    wherein each of said plurality of concaved portions is in direct contact with an area of an outer circumferential surface of a tubular cell of the plurality of tubular cells over a surface area greater than a single line of contact.

13. The fuel cell according to claim 12, wherein a cross-section of each of said plurality of concaved portions obtained by cutting in a plane including a direction normal to an axial direction of said heat exchangers is a polygonal line, and one of said plurality of concaved portions and said outer circumferential surface of one of said tubular cells are in line contact with each other by at least two lines.

14. The fuel cell according to claim 12, wherein said outer circumferential surface of said tubular cells and each of said plurality of concaved portions have curved surfaces.

15. The fuel cell according to claim 14, wherein, if a curvature radius of said outer circumferential surface of said tubular cells is defined as R1 and a curvature radius of each of said plurality of concaved portions for receiving said tubular cells is defined as R2, a relation $R1 \leq R2$ is given.

16. The fuel cell according to claim 12, wherein a contact area of said outer circumferential surface of said tubular cells and the peripheral surface of said heat exchangers is 2% or more and 50% or less of the peripheral surface area of said heat exchangers.

17. The fuel cell according to claim 12, wherein reaction gas passages are formed on said peripheral surfaces of said heat exchangers to have face contact with said tubular cells.

18. The fuel cell according to claim 12, wherein said heat exchangers are disposed in apertures formed by a plurality of said tubular cells arranged in parallel.

19. The fuel cell according to claim 12, wherein a plurality of heat medium passages are incorporated inside said heat exchangers.

20. The fuel cell according to claim 12, wherein the peripheral surface of each of said heat exchangers and said outer circumferential surfaces of four or more of said tubular cells are arranged to contact each other.

21. The fuel cell according to claim 12, wherein said heat exchangers have electric conducting property.

22. The fuel cell according to claim 12, wherein a cooling medium runs inside each of said heat exchangers, and at least a part of an inner surface of each of said heat exchangers, which contacts with said cooling medium, is constituted by an electrical insulating material.

\* \* \* \* \*

UNITED STATES PATENT AND TRADEMARK OFFICE
CERTIFICATE OF CORRECTION

PATENT NO.       : 8,455,148 B2
APPLICATION NO.  : 11/990707
DATED            : June 4, 2013
INVENTOR(S)      : Nakanishi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1349 days.

Signed and Sealed this
Eighth Day of September, 2015

Michelle K. Lee
*Director of the United States Patent and Trademark Office*